United States Patent
Gourmelen et al.

[11] Patent Number: 6,167,341
[45] Date of Patent: *Dec. 26, 2000

[54] VEHICLE ROAD SPEED CONTROL SYSTEM

[75] Inventors: Pascal Gourmelen, Auneuil; Jean-Francois Cocusse, Bonlier, both of France

[73] Assignee: AGCO S.A., France

[*] Notice: This patent issued on a continued prosecution application filed under 37 CFR 1.53(d), and is subject to the twenty year patent term provisions of 35 U.S.C. 154(a)(2).

[21] Appl. No.: 08/384,610

[22] Filed: Feb. 3, 1995

Related U.S. Application Data

[63] Continuation of application No. 08/011,418, Jan. 29, 1993, abandoned.

[30] Foreign Application Priority Data

Feb. 8, 1992 [GB] United Kingdom ............... 9202676

[51] Int. Cl.$^7$ ............................................. B60K 31/04
[52] U.S. Cl. ........................... 701/95; 701/93; 701/50; 180/179
[58] Field of Search ............... 364/426.04, 431.07; 123/350, 352; 180/170, 176, 177, 178, 179; 701/93, 94, 95, 110, 50

[56] References Cited

U.S. PATENT DOCUMENTS

| | | | |
|---|---|---|---|
| 4,374,422 | 2/1983 | O'Keefe, Jr. et al. | 180/179 |
| 4,401,075 | 8/1983 | O'Keefe, Jr. et al. | 180/178 |
| 4,419,729 | 12/1983 | Krieder | 180/179 |
| 4,660,672 | 4/1987 | Katou | 180/178 |
| 4,797,826 | 1/1989 | Onogi et al. | 180/179 |
| 4,858,135 | 8/1989 | Clish et al. | 364/426.04 |
| 4,905,785 | 3/1990 | Kieffer et al. | 180/179 |
| 4,905,786 | 3/1990 | Miyake et al. | 180/179 |
| 4,922,788 | 5/1990 | Greenwood | 475/26 |
| 4,933,859 | 6/1990 | Tsuyama et al. | 364/426.04 |
| 4,936,403 | 6/1990 | Morimoto | 180/176 |
| 4,938,604 | 7/1990 | Naito et al. | 180/179 |
| 4,947,953 | 8/1990 | Morimoto | 180/179 |
| 4,982,805 | 1/1991 | Naitou et al. | 364/426.04 |
| 4,984,166 | 1/1991 | Teratani et al. | 180/179 |
| 4,989,149 | 1/1991 | Mimura et al. | 180/179 |
| 5,003,482 | 3/1991 | Teratani et al. | 180/179 |
| 5,010,490 | 4/1991 | Naito et al. | 364/426.04 |
| 5,012,419 | 4/1991 | Yamamoto | 180/177 |
| 5,019,986 | 5/1991 | Londt et al. | 180/179 |
| 5,024,285 | 6/1991 | Fujita | 180/197 |
| 5,033,571 | 7/1991 | Morimoto | 180/176 |
| 5,079,710 | 1/1992 | Bräuninger et al. | 180/179 |
| 5,129,475 | 7/1992 | Kawano et al. | 364/426.04 |
| 5,148,721 | 9/1992 | Anan et al. | 364/426.04 |
| 5,155,682 | 10/1992 | Ninoyu | 364/426.04 |
| 5,201,381 | 4/1993 | Neuffer et al. | 180/179 |

FOREIGN PATENT DOCUMENTS

| | | |
|---|---|---|
| 0142044 | 1/1988 | European Pat. Off. . |
| 9005650 | 5/1990 | WIPO . |

*Primary Examiner*—Gary Chin
*Attorney, Agent, or Firm*—MacMillan, Sobanski & Todd, LLC

[57] ABSTRACT

A vehicle road speed control system includes a vehicle road speed detection means, parameter storage means, comparator processing means and control signal generation means. The system is arranged to compare measured vehicle road speed with predetermined road speeds obtained from stored parameters. When an upper threshold road speed is exceeded a control signal is generated for an associated transmission control system which causes the operative ratio of an associated vehicle transmission to be reduced such that the vehicle road speed is reduced to at least the upper threshold road speed. The road speed may also be controlled by altering the characteristics of an associated fuel injection such that the road speed is reduced to at least the upper threshold road speed. This may be done in place of controlling the operative ratio of the transmission or in addition.

15 Claims, 4 Drawing Sheets

| RATIO SELECTED | CLUTCH STATUS X=ENGAGED O=DISENGAGED | | | |
|---|---|---|---|---|
| | C1 | C2 | C3 | C4 |
| A | X | X | O | O |
| B | X | O | X | O |
| C | O | X | O | X |
| D | O | O | X | X |

VEHICLE ROAD SPEED CONTROL SYSTEM

This application is a continuation of Ser. No. 08/011,418 filed on Jan. 29, 1993, now abandoned.

BACKGROUND OF THE INVENTION

The invention relates to a vehicle road speed control system, and more particularly to a system for limiting the vehicle road speed to a maximum.

In many countries it is necessary to limit the road speed of some forms of vehicles in order to comply with legislation. In the prior art this has been accomplished by mechanical means within the transmission system of the vehicle which, for example, prevent the selection of certain gear ratios. Alternatively engine speed governors have also been used.

If it is required to remove or change the road speed limitation the transmission system must be physically opened up and parts changed, if certain gear ratios have previously been blanked off, or the governor settings must be eliminated or reset. This can be a long process and thus incur extensive costs, particularly where transmission changes are involved. In addition, for commercial vehicles of any sort, there is an undesirably long period of time for which the vehicle is out of use.

It is an object of the invention to provide an alternative form of vehicle road speed control system which ameliorates the above problems.

It is a further object of the invention to provide an alternative method of controlling vehicle road speeds.

SUMMARY OF THE INVENTION

The invention therefore provides a vehicle road speed control system including:

(a) vehicle road speed detection means;
(b) parameter storage means;
(c) comparator processing means; and
(d) control signal generation means, the system being arranged to compare measured vehicle road speed with predetermined road speeds obtained from stored parameters and, when an upper threshold road speed is exceeded, to generate a control signal for an associated control system to alter an operative parameter or parameters of the vehicle such that, the vehicle road speed is reduced to at least the upper threshold road speed.

The invention provides the advantages that it is relatively cheap to implement and, should the upper threshold road speed require changing after the system has been implemented this may be effected both cheaply and quickly.

In a preferred embodiment the vehicle road speed control system is operative in only a selection of transmission ratios.

The control signal preferably operates on a transmission control system to reduce the operative ratio of an associated vehicle transmission system. In alternative embodiments the control signal may operate on a fuel injection control system to alter the characteristics of fuel injection to an associated vehicle engine or on both a transmission control system and a fuel injection control system to both reduce the operative ratio of an associated transmission and alter the characteristics of fuel injection to an associated engine.

If the measured road speed is above a target road speed but below the upper vehicle threshold road speed a warning may be given to the vehicle driver. In addition to the warning the selector means for the associated vehicle transmission may be rendered inoperable. A warning may also be given to the vehicle driver if the measured road speed is above a lower threshold road speed but below the target road speed. The warnings may be given in the form of a flashing light or lights.

The upper threshold road speed may be dependent on the operative ratio of the associated vehicle transmission, or may alter during the operation of the road speed control system.

The invention also provides a method of limiting the road speed of a vehicle including the steps of:

(a) measuring the road speed of the vehicle;
(b) comparing the measured road speed of the vehicle with a target road speed; and
(c) if, the measured road speed exceeds an upper threshold road speed, generating a control signal which operates on an associated control system to alter an operative parameter or parameters of the vehicle such that the vehicle road speed is reduced to at least the upper threshold road speed.

In a preferred method the control signal operates on a transmission control system to alter the operative ratio of an associated vehicle transmission, alternatively it may operate on a fuel injection control system to alter the characteristics of the fuel injection to an associated vehicle engine or on both a transmission control system and a fuel injection control system.

An embodiment of the invention as applied to an agricultural tractor will now be described, by way of example only, with reference to the accompanying drawings in which:

DETAILED DESCRIPTION OF THE PREFERRED EMBODIMENT

Figure 1:
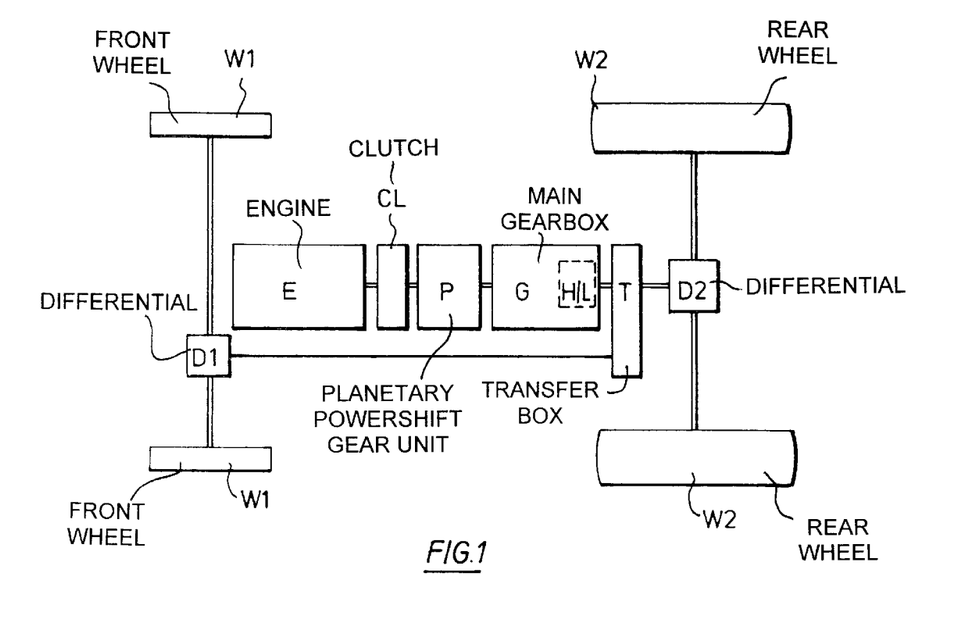
FIG. 1 schematically illustrates a tractor transmission including a planetary powershift gear unit.

Referring to FIG. 1, a tractor transmission is illustrated schematically. It incorporates an engine E which drives the front and rear wheels W1 and W2 via a main clutch CL, a planetary powershift gear unit P, a main gearbox G, a transfer box T and differentials D1 and D2. The main gearbox G will typically have four ratios and a forward/reverse direction selector train and may also include a high/low range facility indicated in dotted detail in FIG. 1.

Figure 2:
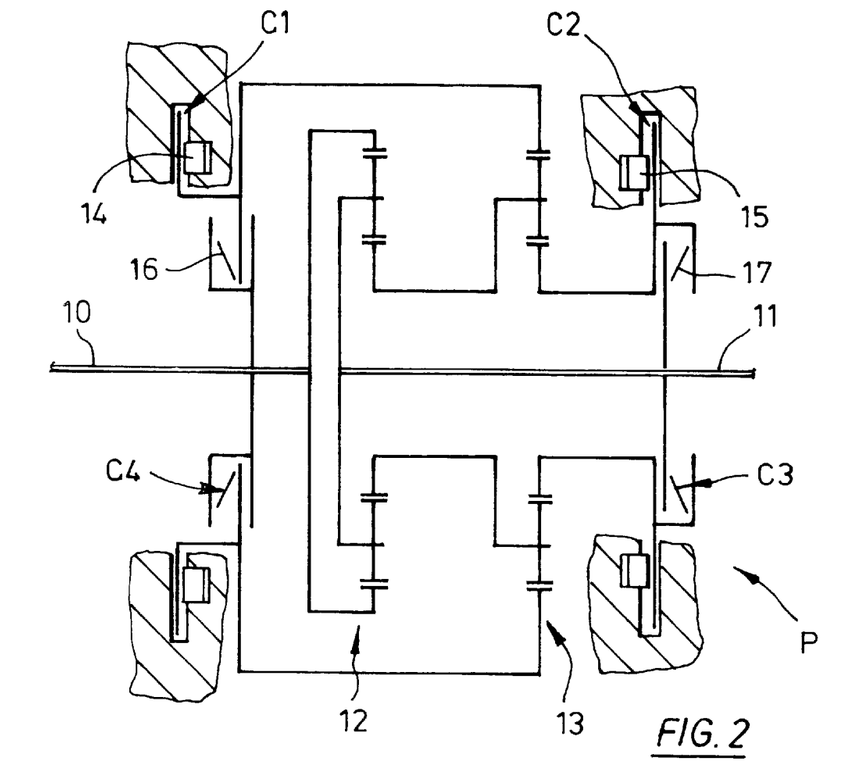
FIG. 2 is a diagrammatic vertical section through a four-ratio planetary powershift gear unit of the kind incorporated in the FIG. 1 transmission.
Figure 3:
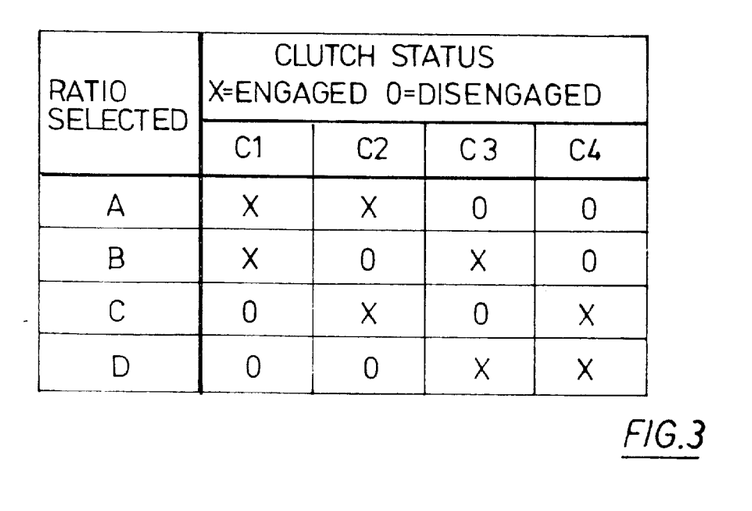
FIG. 3 is a table indicating the engagement status of each clutch within the planetary powershift gear unit of FIG. 2 for each of the four ratios.

Referring now to FIG. 2, powershift unit P, which provides four ratios, A, B, C and D, is illustrated schematically. The powershift unit P will only be described very briefly here since it is the subject of a separate United Kingdom Patent Application, No. 9116856.7, published as GB 2247501, to which the reader is referred for a detailed description of the unit. The powershift unit P incorporates an input shaft 10 and a co-axial output shaft 11 and first and second planetary gear trains 12 and 13. It also includes first to fourth clutches C1, C2, C3 and C4 respectively. First and second clutches C1 and C2 are hydraulically-engaged by annular pistons 14 and 15. The third and fourth clutches C3 and C4 are spring-engaged by belleville springs 16 and 17. The clutches operate in pairs C1 with C4 and C2 with C3, such that when the hydraulically-engaged clutch of a pair is engaged the associated spring-engaged clutch is automatically disengaged, and when the hydraulically engaged clutch is disengaged the associated spring-engaged clutch is automatically engaged. The engagement status of each clutch C1 to C4 for each ratio of the planetary gear unit P is given in tabular form in FIG. 3. It will be appreciated that the ratios A to D of the unit P operate as ranges of the main four ratio gearbox G.

Figure 4:
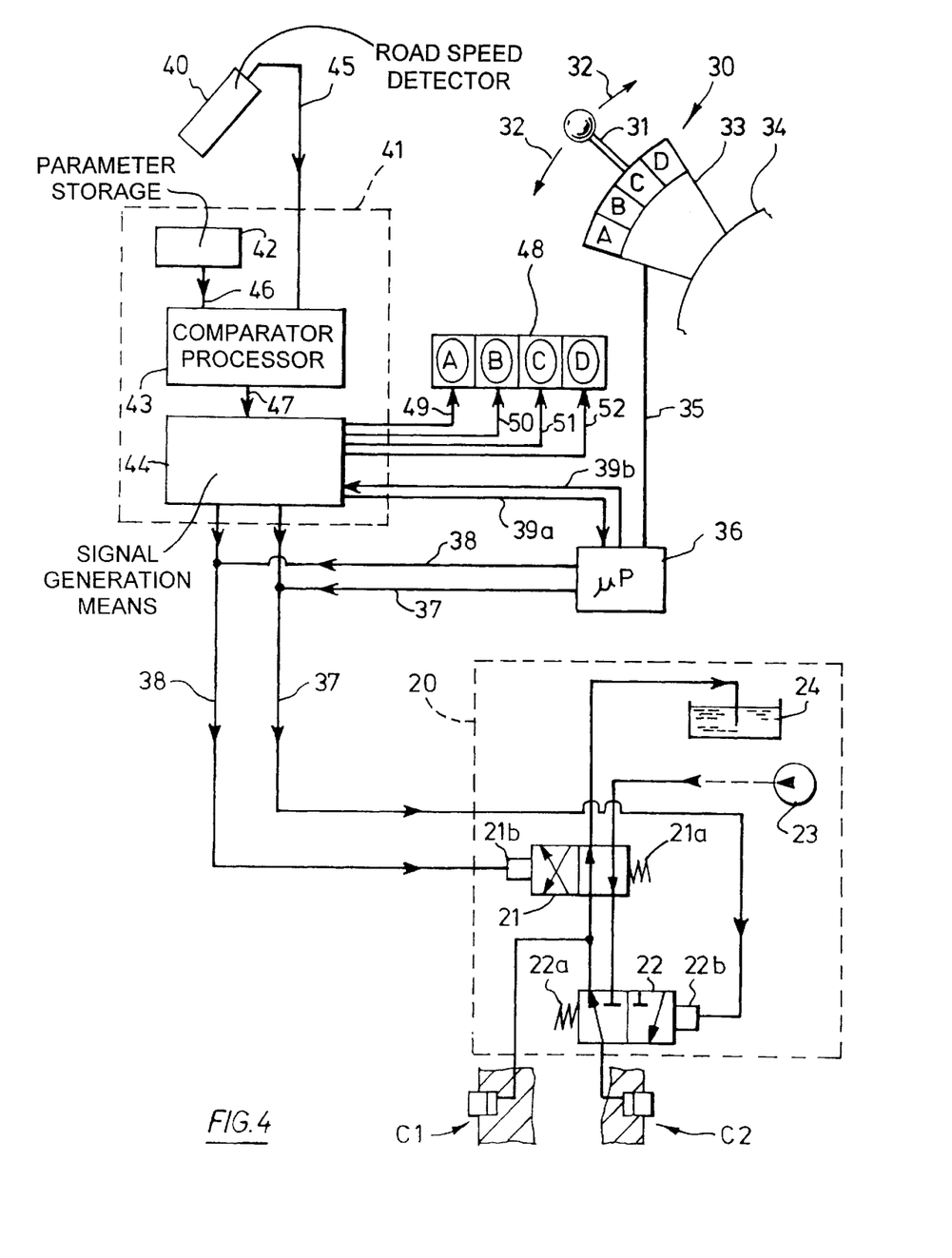
FIG. 4 is a schematic illustration of a vehicle road speed control system according to the invention in combination with a hydraulic control system for the planetary powershift gear unit of FIG. 2, and the manual selector means for the unit.

Referring now to FIG. 4, a vehicle road speed control system according to the invention is illustrated schematically in combination with a hydraulic control system for the powershift unit P and its normal manual selection means. The manual selection means 30 includes a lever 31 movable to each of four ratio selection positions A, B, C and D, as indicated by arrows 32. The lever and its associated housing 33 are mounted on the steering column 34. When a manual selection of a new ratio is made a signal is passed down line 35 to a microprocessor 36. In response to the signal the microprocessor 36, generates appropriate control signals for the hydraulic control system 20 to engage and disengage the necessary clutches. Since the unit P is a powershift unit, actuation of the main clutch CL is not necessary when changing between ratios A to D.

The hydraulic control system 20 will only be described very briefly here since it is the subject of a separate United Kingdom Patent Application, No. 9116851.8, published as GB 2247500, to which the reader is referred for a detailed description. The control system 20 incorporates a four-port two-position flow reversing valve 21 and a three-port two-position flow reversing valve 22 connected in series, a pump 23 and a reservoir 24. Both valves are biased to a first position by respective springs 21a and 22a and are movable by associated solenoids 21b and 22b to their respective second positions. Solenoids 21b and 22b are controlled, during manual operation, by the control signals generated by the microprocessor 36 via lines 37 and 38.

The vehicle road speed control system incorporates a road speed detector 40 of, for instance, well known radar type located on the underside of the tractor and electronic circuitry 41 located, for instance, in the tractor cab. The circuitry 41 incorporates parameter storage means 42, comparator processing means 43 and signal generation means 44. The above modules are connected via lines 45, 46 and 47. A four light indicator array 48, located, for instance, in the dashboard, is connected to the signal generation means 44 by lines 49 to 52. The signal generating means 44 is also connected to the microprocessor 36 by two lines 39a and 39b, the former taking signals from the signal generating means 44 to the microprocessor 36 and the latter from the microprocessor 36 to the signal generating means 44.

Although in this embodiment a separate microprocessor 36 and circuitry 41 are described it will be appreciated that embodiments may be constructed in which a single semiconductor chip or integrated circuit performs all the functions of these components. Indeed, this will normally be the case.

This embodiment of the vehicle road speed control system operates only when the vehicle is in fourth gear in the main gearbox G and also in C or D ratio in the powershift unit P, (i.e. ratios 4C and 4D) since these are the only ratios in which road speeds above the desired maximum are attainable.

The system operates as follows. The road speed detector 40 measures the road speed and passes a signal corresponding to the speed via line 45 to the comparator processor 43 which compares it with speeds calculated from various parameters stored in the parameter storage means 42. Depending on the result of the comparison a signal is sent to the signal generation means 44 which then generates the appropriate signals to control the valves 21 and 22, the indicator array 48, and the microprocessor 36. In normal conditions the indicator light A to D corresponding to the ratio currently in operation is illuminated, when the vehicle road speed control system is in operation the indicator array is used to provide warnings to the driver, as will be described later. When the vehicle is not in 4C or 4D signals from the microprocessor 36 to the signal generation means 44 via line 39b prevent the generation of control signals. The comparative calculations are repeated every 0.5 seconds.

Figure 5:
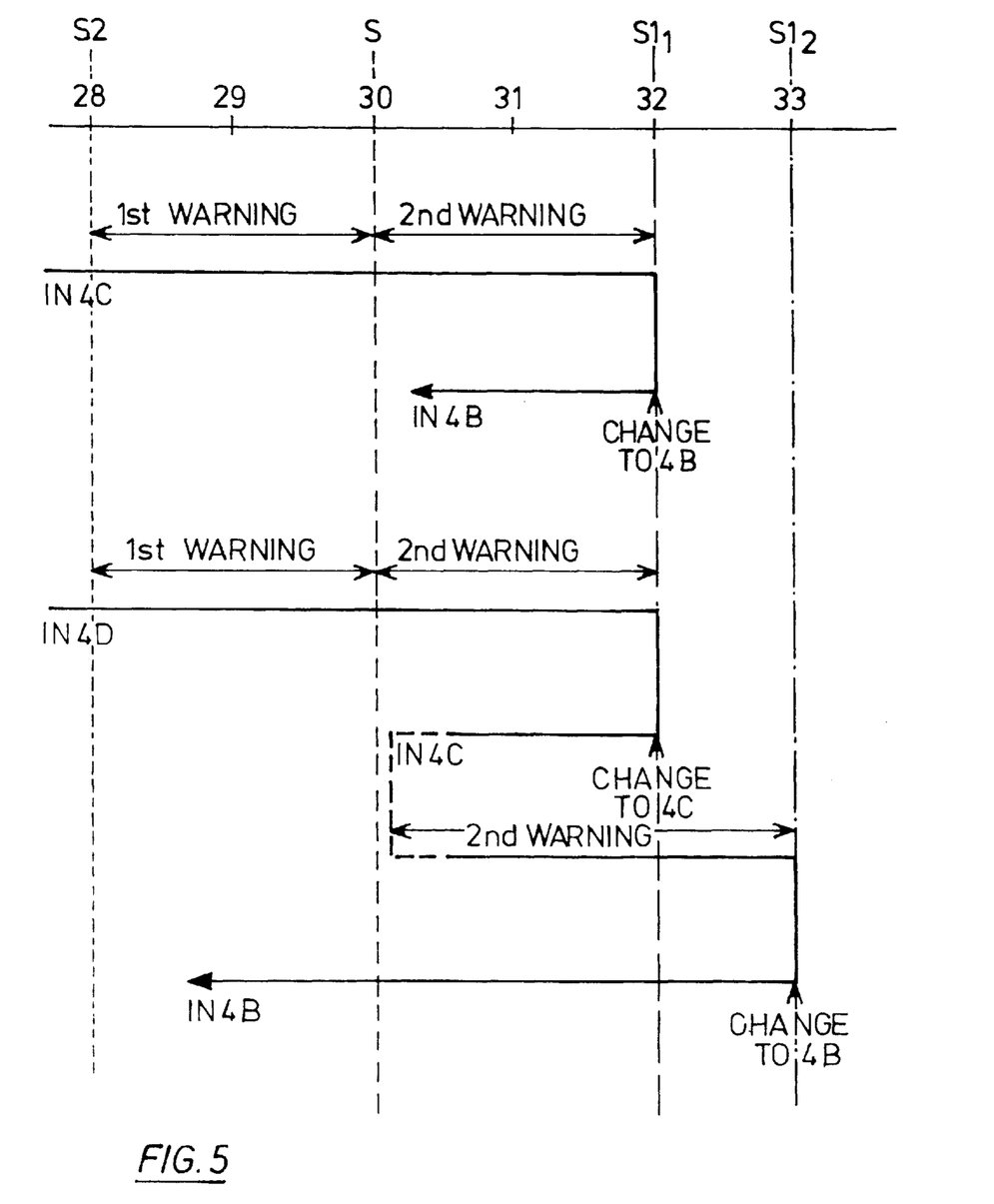
FIG. 5 is a schematic illustration of the operating sequence of the vehicle road speed control system of FIG. 4.

Referring now also to FIG. 5, the operating sequence of the vehicle road speed control system is illustrated schematically. The measured road speed is compared with three different values, a target speed S, an upper threshold speed $S1_1$, or $S1_2$ equal to the target speed plus a respective first percentage, and a lower threshold speed S2 equal to the target speed less a second percentage. In this embodiment the speeds are S=30 km/h, $S1_1$=32 km/h, $S1_2$=33 km/h and S2=28 km/h. There are a number of stored parameters stored in the parameter storage means 42, these are the target speed S, and the first and second percentages. The first percentage may vary, for instance it may be a function of the operative ratio or of whether the system has made a first ratio change or not. In this case there are two values of the first percentage, one in operation when no ratio change has yet been made from which $S1_1$ is generated and the other when a first ratio change has been made from which $S1_2$ is generated.

If the measured road speed is above S2 but below S then a first warning is given to the driver. This warning takes the form of flashing light C or D, corresponding to the ratio in operation at the time, in the indicator array 48. If the ratio selected is 4C or 4D and the measured road speed is above S but below $S1_1$ all four lights A to D in the indicator array 48 flash, and the manual powershift ratio selector is rendered inoperable such that the vehicle driver can no longer change the powershift unit ratio. If the measured road speed continues to rise and exceeds $S1_1$ then the ratio is reduced by the speed control system from 4C to 4B or 4D to 4C as appropriate.

If the operative ratio is now 4B, having been reduced from 4C by the speed control system, light B is lit continuously, and the manual powershift ratio selector is rendered operable again once the road speed drops below the target speed S, so that the vehicle operates normally. If the operative ratio is now 4C, having been reduced from 4D by the speed control system, the operation of the indicator lights depends on the road speed and is essentially as previously described. Thus if the road speed is below S2 light C is lit continuously, if the road speed is between S2 and S light C flashes and if the road speed is above S but below $S1_2$ all four lights in the indicator array 48 flash, and the manual powershift ratio selector continues to be rendered inoperable. If the measured road speed continues to rise, and exceeds $S1_2$ then the ratio is reduced to 4B. The road speed may have continued to rise after the change to 4C either, because the road speed in 4C corresponding to the set engine speed has yet to be reached, or because the driver increased the engine speed further. When the change from 4C to 4B has been made light B is lit continuously, and the manual powershift ratio selector is rendered operable again once the road speed drops below the target road speed S, so that the vehicle operates normally again.

When the ratio changes are made the engine speed is not altered by the control system, but it will rise briefly as it will be driven up by the rotation of the wheels at the high road speed, and will then fall again to the engine speed corresponding to the throttle setting. Therefore the road speed of the vehicle is reduced to below the target speed S. The maximum speed attainable at maximum engine speed in this embodiment is 33 km/h, (i.e. the target speed 30 km/h plus 10% error allowance).

The second ratio change, from C to B after a first ratio change from D to C, is made at a higher road speed than the first ratio change in order to protect the transmission from damage and make the changes smoother. This is necessary because the road speed does not reduce immediately the ratio change is made and the circuitry 41 repeats the calculations every 0.5 seconds, and performs them rapidly. Thus if the second change was made at the same road speed as the first it would occur as a result of the next calculation, and in effect follow immediately after the first resulting in severe jerking of the vehicle and possibly in damage to the transmission. An alternative way of preventing these problems is to arrange for a minimum delay of a predetermined length of time between first and second changes.

A particular sequence of operation has been described, however, the invention is not limited to such a sequence and embodiments may be constructed to operate when different ratios are engaged, to different target and threshold speeds, and with, for instance, different threshold speeds operative in each ratio. In addition, the above embodiment has been described as taking various actions at particular road speeds, it will, however, be appreciated that some degree of overshoot will in general occur before an action takes effect. The degree of overshoot will depend on the detail of the construction of the system.

A system such as this may, for instance, be used in a country which limits the speed of certain types of vehicles, such as tractors. A tractor may be capable of 40 km/h but in one country the speed limit may be 30 km/h, but with a 10% error allowed. Thus, either a mechanical speed limiting means must be incorporated in the transmission (by, for example, preventing selection of certain ratios) or the speed of the engine must be governed, with their accompanying problems, or a system according to the invention may be employed.

The system according to the invention described above provides the advantage that the road speed of the vehicle is limited without losing the ability to use the full performance of the engine in lower gear ratios. Prior art speed governors limit the engine speed to the same value independent of the transmission ratio selected, and thus engine performance which is of considerable use in lower ratios is lost. The system described above also provides the advantage that it does not reduce the number of transmission ratios which may be selected, as is the case in some prior art systems.

Systems according to the invention provide the further advantage that they are relatively cheap to implement and, should the speed limit change, the time taken to modify the system is minimal compared to the prior art since only the parameters stored in the storage means need be changed. In addition, where vehicle operators could relatively easily remove prior art mechanical speed limiters, thus making their vehicles illegal, modification of this system is only achievable with specialist equipment provided to authorised agents.

Vehicle road speed control systems according to the invention are not limited to operating by means of reducing the operative transmission ratio of powershift transmissions. They can also be constructed for use with continuously variable transmissions, commonly known as CVT, in which they would also operate by means of changing the operative transmission ratio. They can also be constructed for use with electronically controlled fuel injected engines, and to operate by means of altering the characteristics of the fuel injection to the engine, thus limiting the engine speed and with it the road speed.

A road speed control system according to the invention arranged to operate by means of controlling the characteristics of fuel injection may be constructed as now described with reference to FIG. 4. The hydraulic control system 20 is replaced by an electronic fuel injection control system and the clutches C1 and C2 by a fuel pump. The system operates substantially as previously described and operation common to the foregoing embodiment will not be described. A control signal, or signals as appropriate, are generated by the signal generation means 44 and pass via lines such as 37 to the fuel injection control system. The control system then alters, for instance, the flow of fuel, and/or the timing of its injection, to the vehicle engine, such that the desired slowing of the vehicle is achieved. Clearly a system such as this must be appropriately managed in order to prevent the vehicle engine stalling, and will not be appropriate in all kinds of vehicles.

Embodiments may also be constructed which operate by means of changing the operative ratio of the vehicle transmission in combination with altering the characteristics of the fuel injection.

What is claimed is:

1. A system for limiting the road speed of an agricultural tractor to a threshold speed, wherein the agricultural tractor includes a transmission having plurality of operative gear ratios that are manually selected by an operator, said road speed limiting system comprising:

means for generating a signal that is representative of the road speed of the agricultural tractor;

means for generating a signal that is representative of the threshold speed; and means for generating a signal that is representative of a target speed that is less than the threshold speed;

means responsive to said road speed signal and said threshold speed signal for generating a control signal whenever the road speed of the agricultural tractor exceeds the threshold speed, said control signal adapted to override the manual selection by the operator of a current operative gear ratio of the transmission and shift the transmission to a lower operative gear ratio to reduce the speed of the agricultural tractor to at least equal to the threshold speed, said means for generating said threshold speed signal including means for generating a first upper threshold speed signal that is greater than said target speed signal and means for generating a second upper threshold speed signal that is greater than said first upper threshold speed signal, said means for generating said control signal being responsive to said road speed signal and said first upper threshold signal for generating said control signal to cause the transmission to change from a current operative gear ratio to a first lower operative gear ratio to reduce the speed of the agricultural tractor to at least equal to the threshold speed, said means for generating said control signal being responsive to said road speed signal and said second upper threshold signal for generating said control signal to cause the transmission to change from the first lower operative gear ratio to a second lower operative gear ratio to reduce the speed of the agricultural tractor to at least equal to the threshold speed.

2. The road speed limiting system defined in claim 1 wherein the target speed is a predetermined percentage less than the threshold speed.

3. The road speed limiting system defined in claim 1 further including means responsive to said road speed signal and said target speed signal for generating a warning signal when the road speed of the agricultural tractor exceeds the target speed.

4. The road speed limiting system defined in claim 1 wherein said means for generating said control signal generates said control signal so as to cause the transmission to change from a current operative gear ratio to a lower operative gear ratio to reduce the speed of the agricultural tractor to at least equal to the target speed.

5. The road speed limiting system defined in claim 1 wherein said means for generating said threshold speed signal includes means for generating a lower threshold speed signal that is less than said target speed signal.

6. The road speed limiting system defined in claim 5 further including means responsive to said road speed signal and said lower threshold speed signal for generating a first warning signal when the road speed of the agricultural tractor exceeds the lower threshold speed.

7. The road speed limiting system defined in claim 6 further including means responsive to said road speed signal and said target speed signal for generating a second warning signal when the road speed of the agricultural tractor exceeds the target speed.

8. The transmission and control system defined in claim 1 further including means for generating a signal that is representative of a target speed that is less than the threshold speed.

9. The transmission and control system defined in claim 8 wherein the target speed is a predetermined percentage less than the threshold speed.

10. The transmission and control system defined in claim 8 further including means responsive to said road speed signal and said target speed signal for generating a warning signal when the road speed of the vehicle exceeds the target speed.

11. The transmission and control system defined in claim 8 wherein said controller causes the transmission to change from a current operative gear ratio to a lower operative gear ratio to reduce the speed of the vehicle to at least equal to the target speed.

12. The transmission and control system defined in claim 8 wherein said means for generating said threshold speed signal includes means for generating an upper threshold speed signal that is greater than said target speed signal and means for generating a lower threshold speed signal that is less than said target speed signal.

13. The transmission and control system defined in claim 12 further including means responsive to said road speed signal and said lower threshold speed signal for generating a first warning signal when the road speed of the vehicle exceeds the lower threshold speed.

14. The transmission and control system defined in claim 13 further including means responsive to said road speed signal and said target speed signal for generating a second warning signal when the road speed of the vehicle exceeds the target speed.

15. The transmission and control system defined in claim 8 wherein said means for generating said threshold speed signal includes means for generating a first upper threshold speed signal that is greater than said target speed signal and means for generating a second upper threshold speed signal that is greater than said first upper threshold speed signal, said controller being responsive to said road speed signal and said first upper threshold signal to cause the transmission to change from a current operative gear ratio to a first lower operative gear ratio to reduce the speed of the vehicle to at least equal to the threshold speed, said controller being responsive to said road speed signal and said second upper threshold signal to cause the transmission to change from the first lower operative gear ratio to a second lower operative gear ratio to reduce the speed of the vehicle to at least equal to the threshold speed.

* * * * *

UNITED STATES PATENT AND TRADEMARK OFFICE
CERTIFICATE OF CORRECTION

PATENT NO. : 6,167,341
DATED : December 26, 2000
INVENTOR(S) : Pascal Gourmelen and Jean-Francois Cocusse It is certified that error appears in the above-identified patent and that said Letters Patent is hereby corrected as shown below:

Column 7,
After claim 7, insert missing Claim 8,
--8. A transmision and control system for limiting the actual speed of a vehicle to a threshold speed comprising:
a transmission including an input shaft, an output shaft, and a plurality of gears that are selectively connectable between said input shaft output shaft so as to provide a plurality of gear ratios therebetween from a lowest gear ratio to a highest gear ratio;
a manually operable shift assembly for generating a signal that is representative of a desired one of the plurality of gear ratios between said input shaft and said output shaft;
a sensor for generating a signal that is representative of the actual speed of the vehicle;
means for generating a signal that is representative of a threshold speed;
a controller that is responsive to said desired gear ratio signal, said actual speed signal, and said threshold speed signal for generating a first control signal when the speed of the vehicle is less that the threshold speed and for generating a second control signal when both (1) the desired gear ratio signal is representative of the highest gear ratio and (2) the speed of the vehicle is greater than the threshold speed; and
a shift control system that is responsive to said first control signal for connecting said plurality of gears between said input shaft and said output shaft so as to provide the desired gear ratio therebetween and to said second control signal for connecting said plurality of gears between said input shaft and said output shaft so as to provide a gear ratio that is lower than the highest gear ratio therebetween, there by limiting the actual actual speed of the vehicle to the threshold speed. --.

Column 7,
After inserting the above missing claim 8, change "8. The transmission and control system defined in claim 1" to -- 9. The transmission and control sytem defined in claim 8 --.
Change "9. The transmission and control system defined in claim 8" to -- 10. The transmission and control system defined in claim 9 --.

Column 8,
Change "10. The transmission and control system defined in claim 8" to -- 11. The transmission and control system defined in claim 9 --.
Change "11. The transmission and control system defined in claim 8" to -- 12. The transmission and control system defined in claim 9 --.
Change "12. The transmission and control system defined in claim 8" to -- 13. The transmission and control system defined in claim 9 --.
Change "13. The transmission and control system defined in claim 12" to -- 14. The transmission and control system defined in claim 13 --.

UNITED STATES PATENT AND TRADEMARK OFFICE
CERTIFICATE OF CORRECTION

PATENT NO. : 6,167,341
DATED : December 26, 2000
INVENTOR(S) : Pascal Gourmelen and Jean-Francois Cocusse It is certified that error appears in the above-identified patent and that said Letters Patent is hereby corrected as shown below:

Column 8,
Change "14. The transmission and control system defined in claim 13" to -- 15. The transmission and control system defined in claim 14 --.
Change "15. The transmission and control system defined in claim 8" to -- 16. The transmission and control system defined in claim 9 --.

Signed and Sealed this

Twenty-fifth Day of December, 2001

Attest:

JAMES E. ROGAN
*Attesting Officer*   *Director of the United States Patent and Trademark Office*